United States Patent [19]
Yamaguchi

[11] Patent Number: 6,041,342
[45] Date of Patent: Mar. 21, 2000

[54] LOW TRAFFIC NETWORK MANAGEMENT METHOD USING ESTIMATED PROCESS EXECUTION TIME FOR MANAGER-AGENT SYNCHRONIZATION

[75] Inventor: Yasuhiro Yamaguchi, Tokyo, Japan

[73] Assignee: NEC Corporation, Tokyo, Japan

[21] Appl. No.: 09/109,874

[22] Filed: Jul. 2, 1998

[30] Foreign Application Priority Data

Jul. 2, 1997 [JP] Japan ................................ 9-176254

[51] Int. Cl.[7] .................................................. G06F 17/00
[52] U.S. Cl. ...................... 709/202; 709/205; 709/235; 709/248
[58] Field of Search .................... 709/248, 235, 709/205, 202

[56] References Cited

FOREIGN PATENT DOCUMENTS 8-274784  10/1996  Japan .

*Primary Examiner*—Zarni Maung
*Assistant Examiner*—Saleh Najjar
*Attorney, Agent, or Firm*—Scully, Scott, Murphy & Presser

[57] ABSTRACT

In a communication network wherein a management station is connected to at least one agent station, an execution request message is first transmitted from the management station to the agent station for requesting it to execute a process. In response, the agent station estimates a length of time taken to execute the process and transmits a first reply message to the management station, and subsequently estimates a length of time remaining to complete the execution of the process. The management station sets a timer according to the length of time contained in the first reply message and starts the timer. When the timer expires, the management station transmits a time request message to the agent station. In response, the agent station transmits a second reply message containing the remaining time. In response to the second reply message, the management station determines that the requested process has been executed if the remaining time is zero. If the remaining time is nonzero, the management station sets the timer according to the second reply message, starts it and determines that the requested process has been executed when the timer expires.

5 Claims, 4 Drawing Sheets

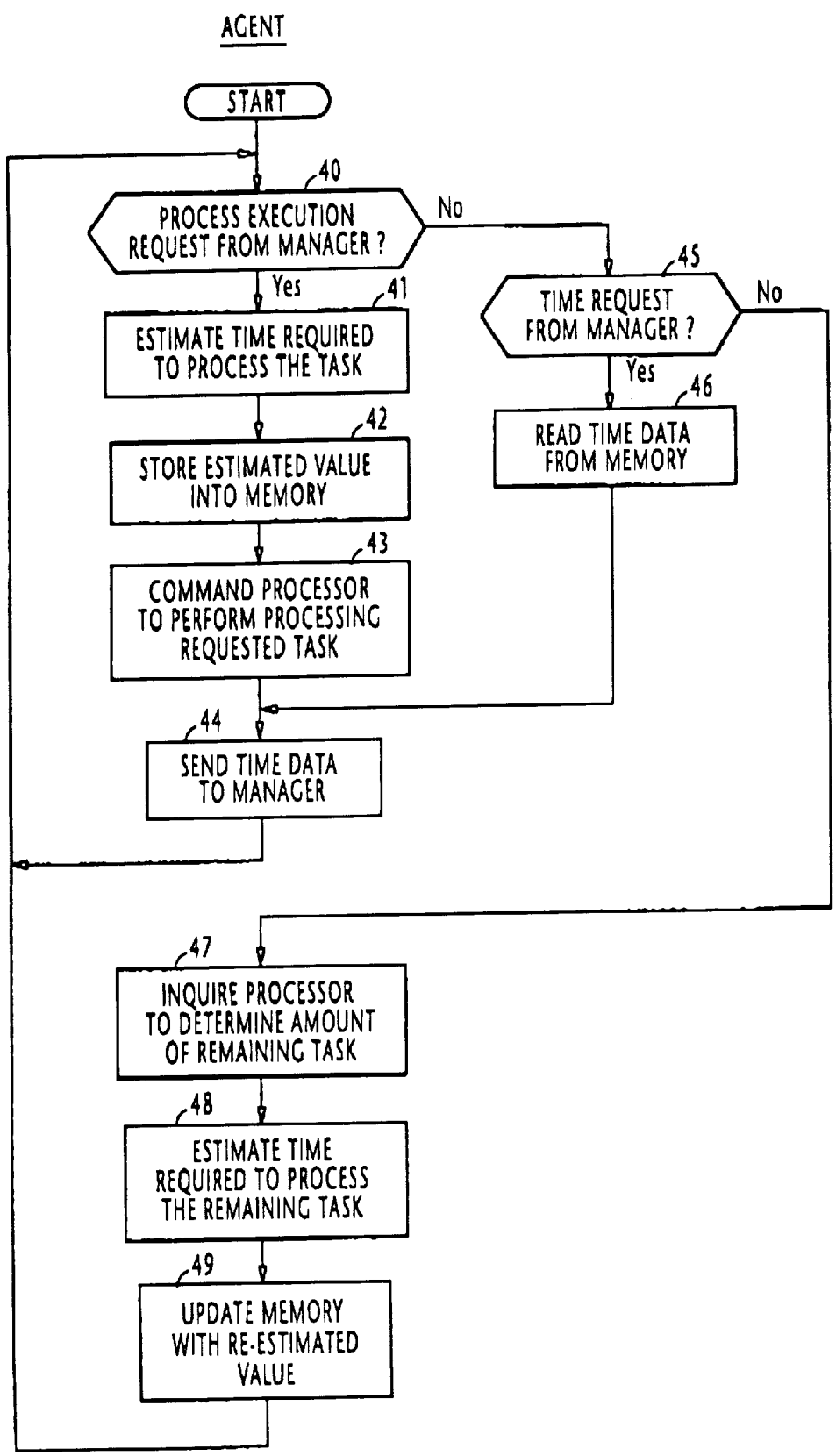

LOW TRAFFIC NETWORK MANAGEMENT METHOD USING ESTIMATED PROCESS EXECUTION TIME FOR MANAGER-AGENT SYNCHRONIZATION

TITLE OF THE INVENTION

Low Traffic Network Management Method Using Estimated Process Execution Time for Manager-Agent Synchronization

BACKGROUND OF THE INVENTION

1. Field of the Invention

The present invention relates generally to the management of communication networks, and more specifically to synchronization of timing events between multiple management stations and a single agent station when the latter is sequentially executing processes requested by the management stations at the same time.

2. Description of the Related Art

In a communication network, SNMP (simple network management protocol) is the well known protocol for the management of the network elements, or agent stations such as hosts and routers under control of a management station, using attributes of management information base (MIB) in which management information of the network is stored. When the management station sequentially issues requests to an agent station to execute a number of processes, or "tasks", the agent station executes them serially. Since the time taken to execute a process varies for a number of reasons, the management station should know, in some way or other, the end timing of the execution of each process. To this end, a mechanism known as "synchronization" is used between management and agent functions.

According to one prior art method, an MIB attribute is defined to indicate the end timing of the execution of a process. After sending a process execution message to an agent station, the requesting management station confirms that the requested process has been executed by repeatedly polling the agent station with a confirmation message. If the execution is still in progress, the agent station returns an "in-progress" message, and replies with the end-timing MIB attribute if the process has been executed at the moment a confirmation message is received. However, since the management station is required to repeatedly interrogate the agent station to determine the current status of the process being executed, the network has to bear the burden of carrying increased traffic between management stations and an agent station.

According to another prior art as disclosed in Japanese Laid-Open Patent Specification Hei-8-274784, the agent station uses an MIB "trap" attribute as an end timing indication. No polling messages are sent from the management station after an initial request message has been sent to the agent station. However, if the trap message is lost, the management station has no way of ascertaining the end timing of the requested process.

SUMMARY OF THE INVENTION

It is therefore an object of the present invention to provide a network management method that performs manager-agent synchronization with reduced traffic.

According to the present invention, a management method is provided for a communication network wherein a management station is connected to at least one agent station. A process execution request message is first transmitted from the management station to the agent station for requesting the agent station to execute a process. Responsive to the execution request message, the agent station estimates a length of time taken to execute the process and transmits a first reply message to the management station, indicating the estimated length of time, and subsequently estimates a length of time remaining to execute the process. The management station sets a timer according to the length of time contained in the first reply message and starts the timer. When the timer expires, the management station transmits a time request message to the agent station. Responsive to the time request message, the agent station transmits a second reply message indicating the estimated length of remaining time. The management station responds to the second reply message by determining that the requested process has been executed if the second reply message indicates that the remaining time is zero, or setting the timer according to the second reply message if the remaining time is nonzero, starting the timer, and determining that the requested process has been executed when the timer expires.

BRIEF DESCRIPTION OF THE DRAWINGS

The present invention will be described in further detail with reference to the accompanying drawings, in which:

FIG. 4 is a flowchart illustrating an agent process of the present invention.

DETAILED DESCRIPTION

Figure 1:
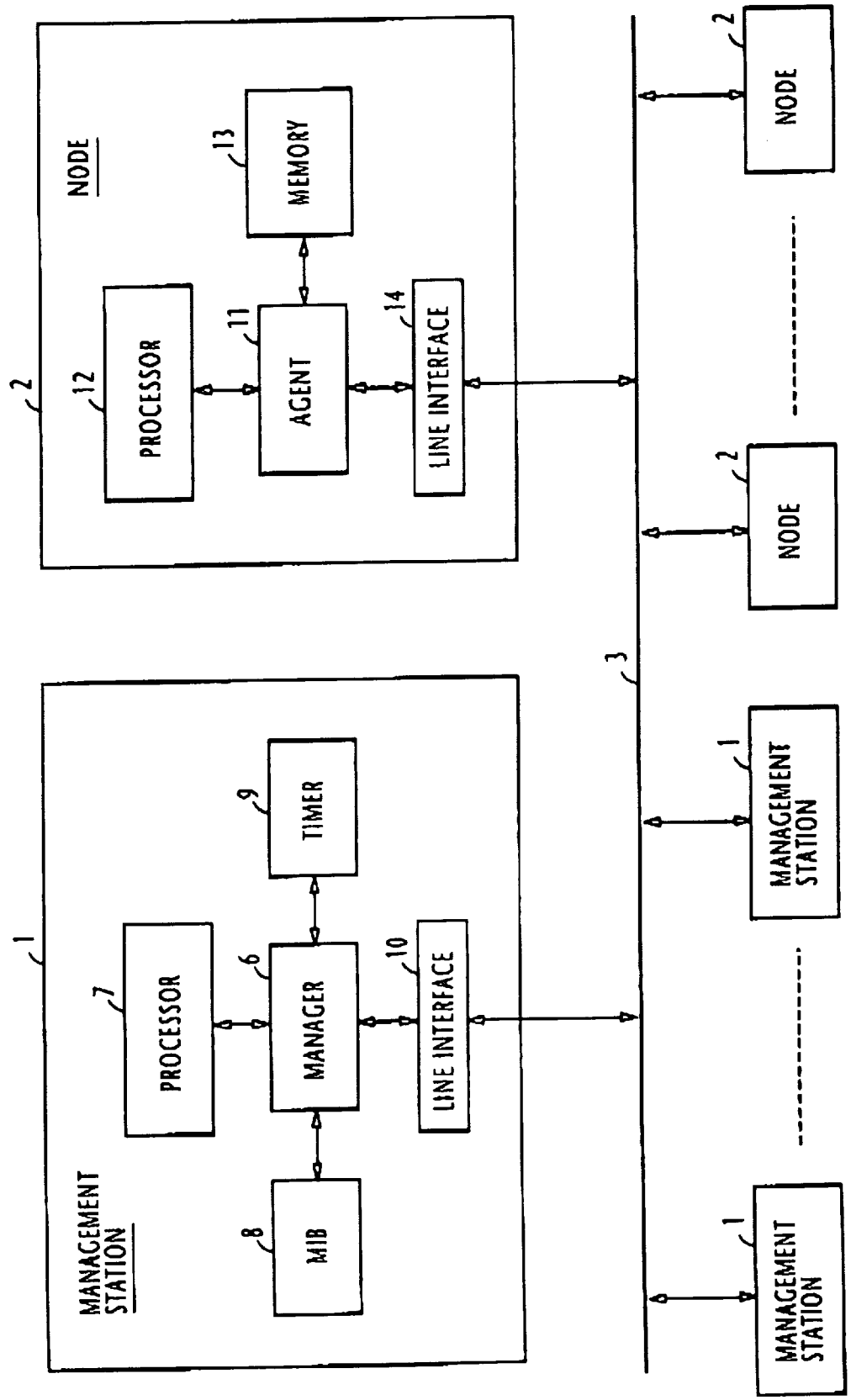
FIG. 1 is a block diagram of a communication network which operates on a management process according to the present invention.

Referring now to FIG. 1, there is shown a communication network of the present invention. The network is formed of a plurality of management stations 1 and a plurality of managed nodes, or agent stations 2, interconnected via a transmission medium 3. Agent stations 2 include a variety of network elements such as host computers, ATM multiplexers, PBXs, time-division multiplexers and routers. Each management station 1 includes a manager 6 which is connected to a processor 7 and a management information base (MIB) 8 in which management information of the network is stored. A timer 9 is connected to the manager 6. Manager 6 exchanges information with the agent stations via a line interface 10 connected to the transmission medium 3. Each agent station 2 includes an agent 11 connected to a processor 12 and a memory 13. Agent 11 exchanges information with the manager 6 via a line interface 14 connected to the transmission medium 3.

Figure 2:
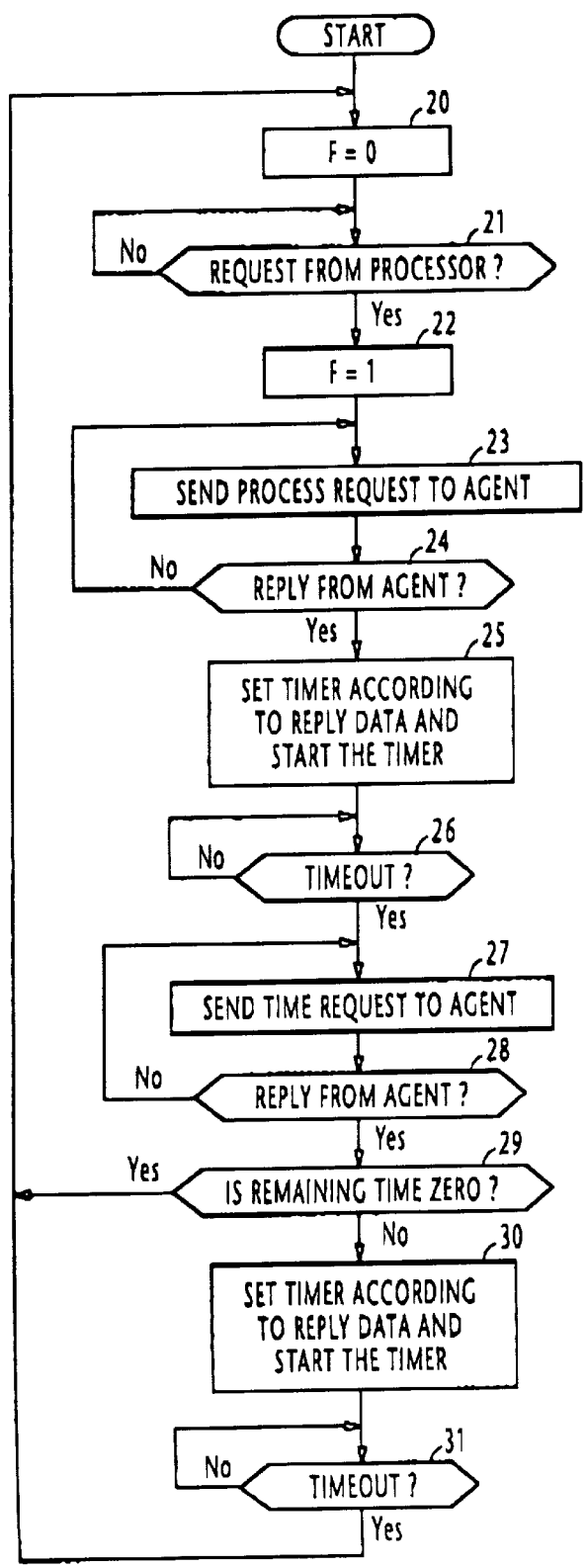
FIG. 2 is a flowchart illustrating a manager process of the present invention.

The operation of the manager 6 of each management station is illustrated in FIG. 2. At step 20, a flag F is initially set equal to 0. Manager constantly monitors the processor 7 at step 21. If the manager 6 initially receives a process execution request from the processor 7, it proceeds to step 22 to set the flag F to 1 and then to step 23 to send a process execution request message to an agent station (node) indicated by the processor to request the agent station to execute a given process. Flow proceeds to step 24 to check to see if a reply message is received from the agent node. If no reply message is returned within a predetermined interval, flow returns from step 24 to step 23 to retransmit the process request message. At step 25, the manager 6 sets the timer 9 according to time data contained in the reply message. This time data indicates an estimated length of time which will be taken by the agent 11 to execute the requested process, and starts the timer 9.

Flow proceeds to step 26 to determine whether the timer has expired. If so, the manager 6 proceeds to step 27 to send a time request message to the agent node (step 28) and waits for a reply message which contains time data indicating an estimated time remaining to execute the process. If no reply message is returned within a predetermined interval, flow returns from step 28 to step 27 to retransmit the rime request message to the agent station.

If the manager receives a reply message at step 28, it checks to see if the remaining time is zero or nonzero (step 29). If the remaining time is zero, it is determined that the whole process has been executed and flow returns to the starting point of the routine to reset the flag F to 0. Otherwise, flow proceeds to step 30 to set the timer 9 according to the nonzero remaining time data contained in the reply message and start the timer. When the timer 9 expires (step 31), the manager 6 determines that the process has been executed at the agent station and returns to the starting point of the routine.

Figure 3:
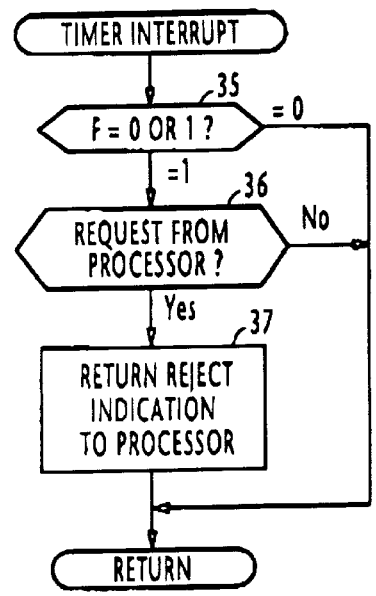
FIG. 3 is a flowchart of a timer interrupt routine associated with the flowchart of FIG. 2.

A periodic intervals, the main routine is interrupted and a timer interrupt routine, shown in FIG. 3, is run. When flag F is 1 indicating that there is a process being executed (step 35) and there is also a subsequent request from the processor (step 36), flow proceeds to step 37 to return a reject indication to the processor, and then returns to the main routine.

The operation of the agent 11 of each managed node starts with step 40, as shown in FIG. 4, when it receives a process execution message from the manager 6. At step 41, the agent 11 estimates the amount of time which will be taken by the processor 12 to execute the requested process. Flow proceeds to step 42 to store the estimated time value into the memory 13, and commands the processor 12 to begin processing the requested process (step 43) and sends a reply to the manager 6, containing the estimated processing time (step 44). Flow then returns to the starting point of the routine.

When no request message is received from the manager 6, the agent 11 proceeds from step 40 to step 45 to determine if a time request message is received from the manager. Immediately following the transmission of the initial time data message, the agent 11 still has not received a time request message, so the decision at step 45 yields a negative answer. Flow proceeds to step 47 where the agent 11 inquires the processor 12 to determine the amount of remaining process and re-estimates the amount of time necessary to complete the execution of the remaining process (step 48). At step 49, the agent 11 updates the memory 13 with the estimated remaining time value and returns to the starting point of the routine. Steps 47 to 49 are executed at intervals as long as the agent 11 receives no request messages. As a result, the precision of the estimated time data increases as the processor 12 approaches the end of the task.

When the agent 11 receives a time request message from the manager 6 at step 45, flow proceeds to step 46 to read the updated time data from the memory 13 and proceeds to step 44 to send the retrieved time data to the manager 6.

Figure 5A:
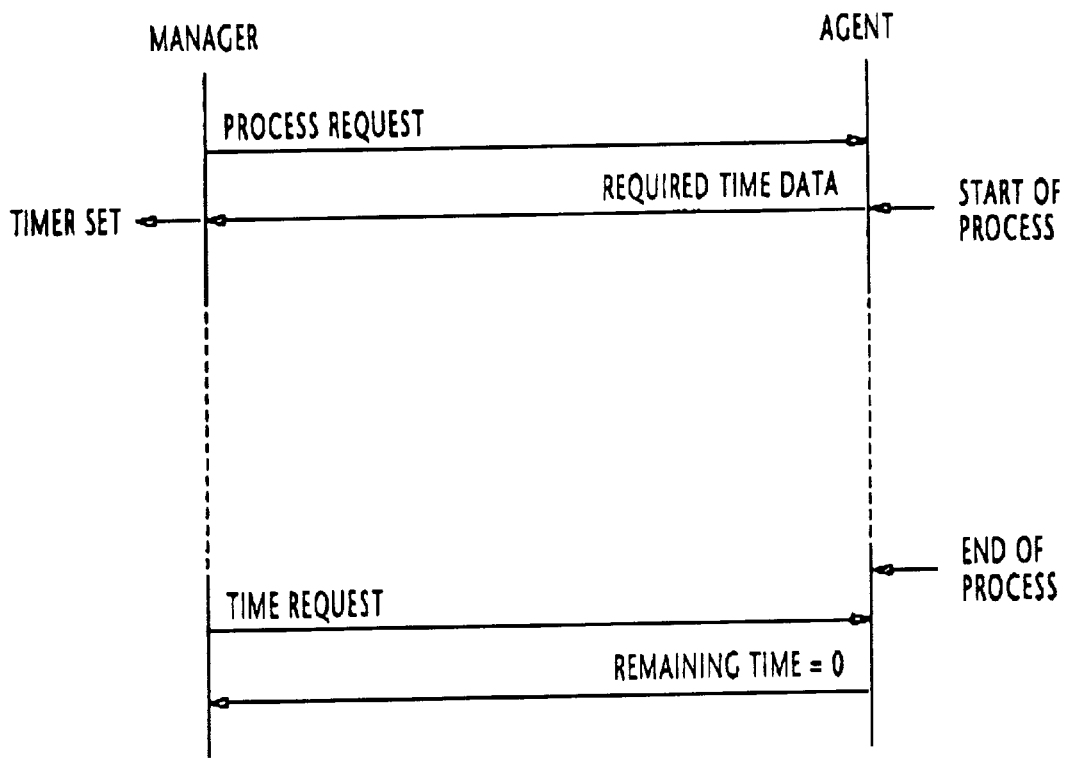
FIGS. 5A and 5B are sequence diagrams of the operations of a management station and an agent station.

A time sequence diagram of FIG. 5A illustrates an operation of the manager 6 and the agent 11 when the manager 6 sends a time request message immediately after the agent 11 has completed the requested task. Specifically, the manager initially sends a process execution message to the agent, requesting it to process a task. In response, the agent replies with an estimate amount of time taken to execute the task. The manager responds to the reply from the agent by setting the timer 9 according to the initial time value and starting it. When the timer expires, the manager sends a time request message to the agent (step 27). Because of the nature of estimation, the initial time value may not be precise. Thus, the manager is likely to transmit a time request message after the end of the process and the agent replies with a zero remaining time (step 28). With the remaining time being equal to zero, the manager determines that the requested task has been executed (step 29) and resets the flag to zero.

Figure 5B:
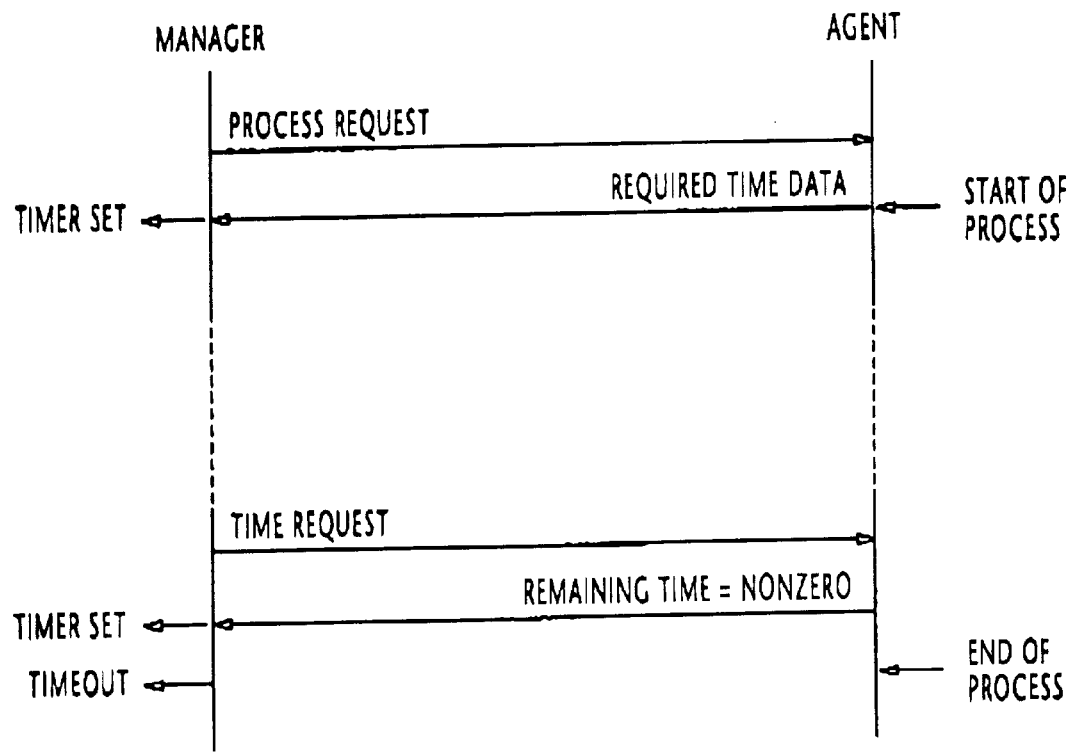

A time sequence diagram of FIG. 5B illustrates an operation of the manager 6 and the agent 11 when the manager 6 sends a time request message immediately before the agent 11 has completed the requested task. Specifically, the manager initially sends a process execution message to the agent, requesting it to process a task. In response, the agent replies with an estimated time taken to complete the task. The manager responds to this reply by setting the timer 9 according to the initial time value and starting it. When the timer expires before the agent completes the execution of the task the manager sends a time request message to the agent (step 27), which replies with a nonzero remaining time (step 28). The manager responds to this reply by setting the timer 9 according to the nonzero remaining time and restarting it (step 30). When the timer expires again (step 31), the manager knows that the execution of the process at the agent is completed and resets the flag to zero.

What is claimed is:

1. A management method for a communication network wherein a management station is connected to at least one agent station, comprising the steps of:

a) transmitting an execution request message from the management station to said agent station for requesting the agent station to execute a process;

b) responsive to the execution request message, estimating, at said agent station, a length of time taken to execute the process and transmitting a first reply message to the management station, indicating said length of time, and subsequently estimating a length of time remaining to execute said process;

c) setting a timer, at said management station, according to the length of time contained in the first reply message, starting the timer, and transmitting a time request message to the agent station when said timer expires;

d) responsive to the time request message, transmitting, from the agent station to the management station, a second reply message indicating the estimated length of remaining time; and e) responsive to the second reply message, determining, at said management station, that the requested process has been executed if the second reply message indicates that the length of remaining time is zero, or setting the timer according to the second reply message if the length of remaining time is nonzero, starting the timer, and determining that the requested process has been executed when the timer expires.

2. The method of claim 1, further comprising the steps of:
   determining whether said second reply message is received from the agent station within a predetermined interval; and if said second reply message is not received within said predetermined interval, retransmitting said time request message from the management station and if said second reply message is received within said predetermined interval, performing the step (e).

3. A communication network comprising;

a management station having a timer; and at least one agent station connected to the management station, said management station transmitting an execution request message to said agent station for requesting the agent station to execute a process, setting and starting said timer according to time data, and transmitting a time request message to the agent station when said timer expires, the agent station being responsive to said execution request message for estimating a length of time taken to execute said process, transmitting a first reply message containing the estimated length of time as said time data to said management station, subsequently estimating a length of time remaining to execute said process, the agent station being further responsive to the time request message subsequently received from the management station for transmitting a second reply message indicating the remaining time, said management station determining that the requested process has been executed if the remaining time contained in the second reply message is zero, or setting said timer according to the second reply message if the remaining time is nonzero, starting said timer, and determining that the requested process has been executed when the timer expires.

4. The communication network of claim 3, wherein the agent station is arranged to constantly update the length of remaining time to execute said process.

5. The communication network of claim 3, wherein the management station is arranged to:

determine whether said second reply message is received from the agent station within a predetermined interval; and if said second reply message is not received within said predetermined interval, retransmit said time request message to the agent station.

* * * * *